United States Patent
Joseph et al.

(10) Patent No.: US 9,004,363 B2
(45) Date of Patent: Apr. 14, 2015

(54) DIFFUSER ENGINE FOR BARCODE IMAGING SCANNER

(71) Applicant: Symbol Technologies, Inc., Schaumburg, IL (US)

(72) Inventors: Eugene B. Joseph, Coram, NY (US); Mark E. Drzymala, St. James, NY (US); Duanfeng He, South Setauket, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 13/690,461

(22) Filed: Nov. 30, 2012

(65) Prior Publication Data

US 2013/0284809 A1 Oct. 31, 2013

Related U.S. Application Data

(60) Provisional application No. 61/639,346, filed on Apr. 27, 2012.

(51) Int. Cl.
*G06K 7/10* (2006.01)
*G06K 7/00* (2006.01)
*G06K 7/14* (2006.01)

(52) U.S. Cl.
CPC ........ *G06K 7/10831* (2013.01); *G06K 7/10742* (2013.01)

(58) Field of Classification Search
CPC .......... G06K 7/10831; G06K 7/10702; G06K 7/10722; G06K 7/10732; G06K 7/10742; G06K 7/14; G02F 1/133606
USPC ............... 235/435, 439, 454, 462.01, 462.06, 235/462.11, 462.21, 462.45, 472.01, 462.35
See application file for complete search history.

(56) References Cited

U.S. PATENT DOCUMENTS

| | | | | |
|---|---|---|---|---|
| 5,585,616 A | * | 12/1996 | Roxby et al. | 235/462.06 |
| 6,039,255 A | | 3/2000 | Seo | |
| 6,073,851 A | * | 6/2000 | Olmstead et al. | 235/462.45 |
| 6,105,869 A | * | 8/2000 | Scharf et al. | 235/454 |
| 6,661,521 B1 | | 12/2003 | Stern | |
| 7,419,098 B2 | | 9/2008 | Hyde et al. | |

(Continued)

FOREIGN PATENT DOCUMENTS

| | | |
|---|---|---|
| EP | 1723576 B1 | 9/2011 |
| WO | 2008076580 A1 | 6/2008 |

OTHER PUBLICATIONS

International Search Report and Written Opinion mailed Jun. 19, 2013 in counterpart appilcation PCT/US2013/034933.

*Primary Examiner* — Thien M Le
*Assistant Examiner* — Claude J Brown
(74) *Attorney, Agent, or Firm* — Nong-Qiang Fan

(57) ABSTRACT

An apparatus includes a diffusive plate that is substantially perpendicular to the optical axis of an imaging lens arrangement and covers a side face of a solid rectangular defining a volume space within which parts of a scan engine are deposited. The parts of the scan engine including at least the illumination light source, the imaging lens arrangement, an imaging sensor, and a controller for controlling both the illumination light source and the imaging sensor. The diffusive plate includes a first opening to allow light enter the imaging lens arrangement through the first opening. The area enclosed by the boundary of the diffusive plate substantially equal to the area of the side face of the solid rectangular.

18 Claims, 4 Drawing Sheets

(56) References Cited

U.S. PATENT DOCUMENTS

| | | |
|---|---|---|
| 8,028,913 B2 | 10/2011 | Liu et al. |
| 8,286,878 B2 | 10/2012 | Nunnink |
| 8,374,498 B2 | 2/2013 | Pastore |
| 2002/0096566 A1* | 7/2002 | Schwartz et al. ........ 235/462.42 |
| 2002/0125322 A1* | 9/2002 | McCall et al. ........... 235/462.42 |
| 2005/0011954 A1* | 1/2005 | Hennick et al. ............... 235/454 |
| 2005/0072845 A1* | 4/2005 | Maiman ........................ 235/454 |
| 2006/0027659 A1* | 2/2006 | Patel et al. .................... 235/454 |
| 2007/0040034 A1* | 2/2007 | Hennick et al. .......... 235/462.41 |
| 2007/0051814 A1* | 3/2007 | Ehrhart et al. ........... 235/462.08 |
| 2007/0108284 A1* | 5/2007 | Pankow et al. ................ 235/454 |
| 2008/0089063 A1* | 4/2008 | Chen ............................. 362/246 |
| 2008/0128511 A1* | 6/2008 | Schwartz et al. ........ 235/462.43 |
| 2008/0142600 A1* | 6/2008 | Joseph et al. ............ 235/462.42 |
| 2008/0165307 A1* | 7/2008 | Adachi et al. ................... 349/62 |
| 2009/0277963 A1* | 11/2009 | Van Kerkhoven et al. ........................ 235/462.21 |
| 2009/0321524 A1* | 12/2009 | Bellows et al. .......... 235/462.45 |
| 2010/0020539 A1* | 1/2010 | Nunnink ....................... 362/235 |
| 2010/0025469 A1* | 2/2010 | Gerst et al. .................... 235/455 |
| 2010/0065641 A1* | 3/2010 | Liu et al. .................. 235/462.32 |
| 2010/0155485 A1* | 6/2010 | Tan et al. ................. 235/462.42 |
| 2011/0024506 A1* | 2/2011 | Nunnink ..................... 235/472.01 |

* cited by examiner

US 9,004,363 B2

DIFFUSER ENGINE FOR BARCODE IMAGING SCANNER

RELATED APPLICATIONS

The present application is related to claims benefit under 35 U.S.C. §119(e) from U.S. Provisional Patent Application Ser. No. 61/639,346, filed Apr. 27, 2012, titled "DIFFUSER ENGINE FOR IMAGING DIRECT PART MARKING", the entire contents of which being incorporated herein by reference.

FIELD OF THE DISCLOSURE

The present disclosure relates generally to imaging-based barcode scanners.

BACKGROUND

Various electro-optical systems have been developed for reading optical indicia, such as barcodes. A barcode is a coded pattern of graphical indicia comprised of a series of bars and spaces of varying widths. In a barcode, the bars and spaces have differing light reflecting characteristics. Some of the barcodes have a one-dimensional structure in which bars and spaces are spaced apart in one direction to form a row of patterns. Examples of one-dimensional barcodes include Uniform Product Code (UPC), which is typically used in retail store sales. Some of the barcodes have a two-dimensional structure in which multiple rows of bar and space patterns are vertically stacked to form a single barcode. Examples of two-dimensional barcodes include Code 49 and PDF417.

Systems that use one or more imaging sensors for reading and decoding barcodes are typically referred to as imaging-based barcode readers, imaging scanners, or imaging readers. An imaging sensor generally includes a plurality of photosensitive elements or pixels aligned in one or more arrays. Examples of imaging sensors include charged coupled devices (CCD) or complementary metal oxide semiconductor (CMOS) imaging chips.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
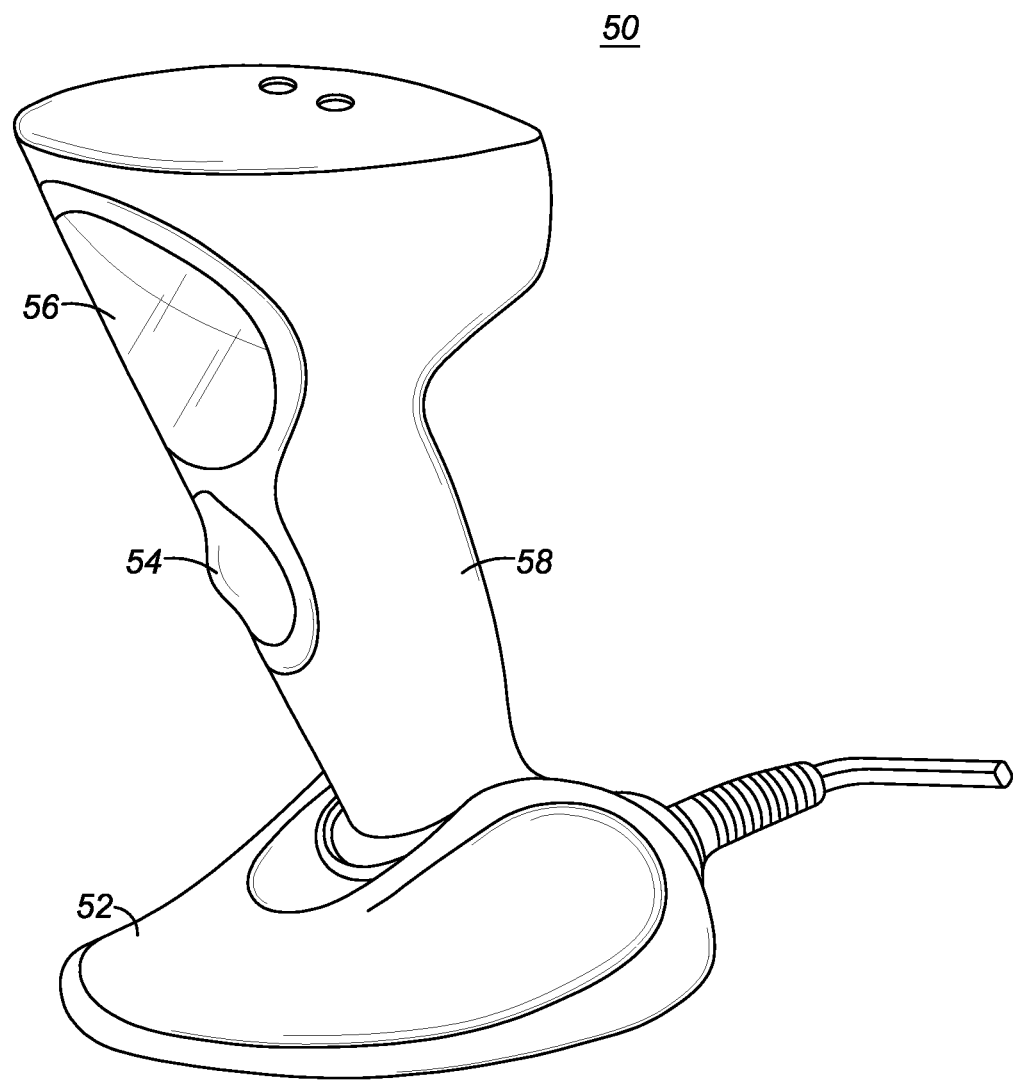
FIG. 1 shows an imaging scanner in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

FIG. 1 shows an imaging scanner 50 in accordance with some embodiments. The imaging scanner 50 has a window 56 and a housing 58 with a handle. The imaging scanner 50 also has a base 52 for supporting itself on a countertop. The imaging scanner 50 can be used in a hands-free mode as a stationary workstation when it is placed on the countertop. The imaging scanner 50 can also be used in a handheld mode when it is picked up off the countertop and held in an operator's hand. In the hands-free mode, products can be slid, swiped past, or presented to the window 56. In the handheld mode, the imaging scanner 50 can be moved towards a barcode on a product, and a trigger 54 can be manually depressed to initiate imaging of the barcode. In some implementations, the base 52 can be omitted, and the housing 58 can also be in other shapes. In FIG. 1, a cable is also connected to the base 52. In other implementations, when the cable connected to the base 52 is omitted, the imaging scanner 50 can be powered by an on-board battery and it can communicate with a remote host by a wireless link.

Figure 2:
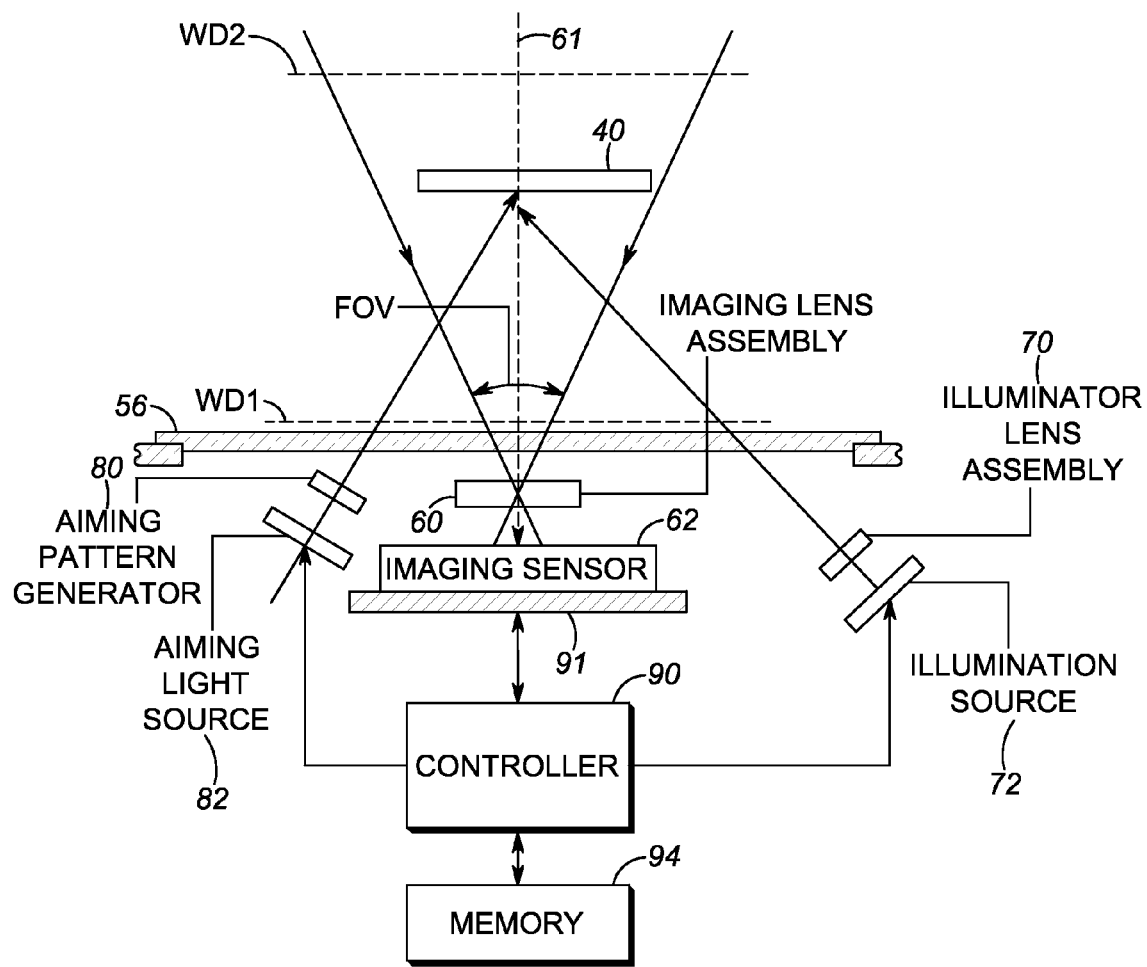
FIG. 2 is a schematic of an imaging scanner in accordance with some embodiments.

FIG. 2 is a schematic of an imaging scanner 50 in accordance with some embodiments. The imaging scanner 50 in FIG. 2 includes the following components: (1) an imaging sensor 62 positioned behind an imaging lens arrangement 60; (2) an illuminating lens arrangement 70 positioned in front of an illumination source 72; (3) an aiming pattern generator 80 positioned in front of an aiming light source 82; and (4) a controller 90. In FIG. 2, the imaging lens arrangement 60, the illuminating lens arrangement 70, and the aiming pattern generator 80 are positioned behind the window 56. The imaging sensor 62 is mounted on a printed circuit board 91 in the imaging scanner.

The imaging sensor 62 can be a CCD or a CMOS imaging device. The imaging sensor 62 generally includes multiple pixel elements. These multiple pixel elements can be formed by a one-dimensional array of photosensitive elements arranged linearly in a single row. These multiple pixel elements can also be formed by a two-dimensional array of photosensitive elements arranged in mutually orthogonal rows and columns. The imaging sensor 62 is operative to detect light captured by an imaging lens arrangement 60 along an optical path or axis 61 through the window 56. Generally, the imaging sensor 62 and the imaging lens arrangement 60 are designed to operate together for capturing light scattered or reflected from a barcode 40 as pixel data over a two-dimensional imaging field of view (FOV).

The barcode 40 generally can be located anywhere in a working range of distances between a close-in working distance (WD1) and a far-out working distance (WD2). In one specific implementation, WD1 is in a close proximity to the window 56, and WD2 is about a couple of feet from the window 56. Some of the imaging scanners can include a range finding system for measuring the distance between the barcode 40 and the imaging lens arrangement 60. Some of the imaging scanners can include an auto-focus system to enable a barcode be more clearly imaged with the imaging sensor 62 based on the measured distance of this barcode. In some implementations of the auto-focus system, the focus length of the imaging lens arrangement 60 is adjusted based on the measured distance of the barcode. In some other implementations of the auto-focus system, the distance between the imaging lens arrangement 60 and the imaging sensor 62 is adjusted based on the measured distance of the barcode.

In FIG. 2, the illuminating lens arrangement 70 and the illumination source 72 are designed to operate together for generating an illuminating light towards the barcode 40 during an illumination time period. The illumination source 72 can include one or more light emitting diodes (LED). The illumination source 72 can also include a laser or other kind of light sources. The aiming pattern generator 80 and the aiming light source 82 are designed to operate together for generating a visible aiming light pattern towards the barcode 40. Such aiming pattern can be used by the operator to accurately aim the imaging scanner at the barcode. The aiming light source 82 can include one or more light emitting diodes (LED). The aiming light source 82 can also include a laser, LED, or other kind of light sources.

In FIG. 2, the controller 90, such as a microprocessor, is operatively connected to the imaging sensor 62, the illumination source 72, and the aiming light source 82 for controlling the operation of these components. The controller 90 can also be used to control other devices in the imaging scanner. The imaging scanner 50 includes a memory 94 that can be accessible by the controller 90 for storing and retrieving data. In many embodiments, the controller 90 also includes a decoder for decoding one or more barcodes that are within the imaging field of view (FOV) of the imaging scanner 50. In some implementations, the barcode 40 can be decoded by digitally processing a captured image of the barcode with a microprocessor.

In operation, in accordance with some embodiments, the controller 90 sends a command signal to energize the illumination source 72 for a predetermined illumination time period. The controller 90 then exposes the imaging sensor 62 to capture an image of the barcode 40. The captured image of the barcode 40 is transferred to the controller 90 as pixel data. Such pixel data is digitally processed by the decoder in the controller 90 to decode the barcode. The information obtained from decoding the barcode 40 is then stored in the memory 94 or sent to other devices for further processing.

Figure 3:
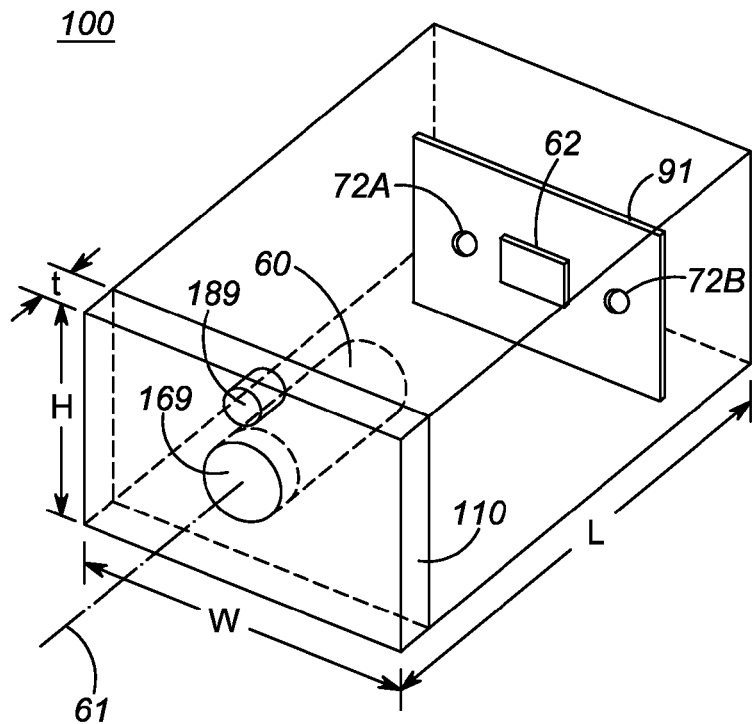
FIG. 3 and FIG. 4 are schematics of a DPM-capable scan engine 100 in accordance with some embodiments.

The imaging scanners are often used in applications involving Direct Part Marking (DPM). DPM refers to making permanent, machine readable marks in a variety of physical substrates. An important class of substrates is shiny (mirrored or mirror-like) surfaces, especially on metals, because these are notorious difficult to read with a scanner. To make DPM on shiny surfaces easier to read, the scanners are generally created with a large featureless and diffusive surface facing the front, and illuminated evenly with light, so that the part bearing the DPM can reflect a part of this surface back to the imager in the scanner which can in turn image it with some contrast. The extent of this diffusive surface is what makes the scanner operate with ease; the larger the extent, the easier it is to aim the scanner. It is for this reason most DPM scanners are rather large, especially in the front. On the other hand, it is beneficial to make a scan-engine that is capable of decoding DPM. These scan engines can be incorporated in handheld computers or other devices that require the scanning of DPM. For such a scan engine to be easily incorporated in different devices, it is important for it to be relatively small, so that it can be more easily integrated in the available space, and not unduly expand the size of the host device. As shown in FIG. 3, a scan engine 100 needs to be confined within a volume that has a width W, height H, and length L. In some implementations, the scan engine 100 is also in the shape of solid rectangular with a width W, height H, and length L. But, the scan engine 100 can also has other shapes confined within the volume as shown in FIG. 3.

Figure 4:
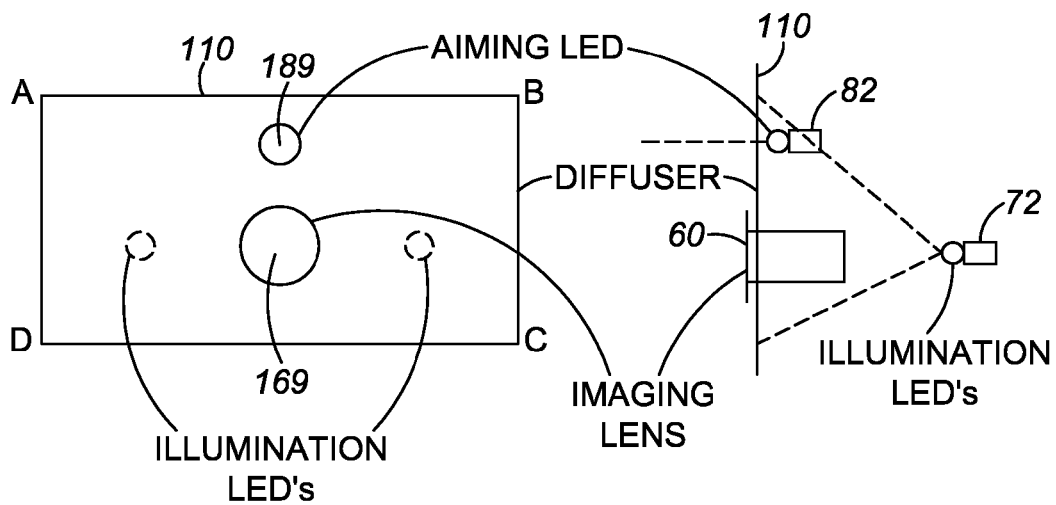

FIG. 3 and FIG. 4 are schematics of a DPM-capable scan engine 100 in accordance with some embodiments. Substantially the entire front surface of the scan engine 100 is a diffusive surface 110. As shown in FIG. 4, the front surface 110 of an imaging scan engine can include an opening 169 for the camera lens 60, an opening 189 for an aiming light source 82. The aiming light source 82 can include an LED or a laser. In one embodiment, other than the opening 169 and the opening 189, the rest of the front surface 110 is almost all filled with a diffuser. The diffuser is illuminated with one or more LEDs 72 from behind. In the implementation as shown in FIG. 4, the LEDs 72 are offset from the camera so that it is not blocked by the camera or its lens.

In another embodiment, an auxiliary diffuser could be designed to be mounted outside of the host device for the scan engine. This diffuser is separately illuminated, and its brightness level is designed to approximate that of the diffuser in front of the scan engine. The external diffuser is built to be impact resistant, such as with flexibility offered by rubber-like material, or rigidity offered by metallic material, or a combination thereof. The external diffuser gives the designer of the host device the flexibility of not having to enlarge the housing of the device, yet achieving superior DPM scanning ability. The auxiliary diffuser is optional, so that the same device can be made without it, such as for fixed-mount applications, or for a device with the same form-factor but does not scan DPM or shiny DPM. A video feedback can be provided to the installer, if the device is to be used in a relatively fixed position and orientation in relation to the target. This is often true for fixed-mount scanners used in manufacturing process.

In general, a DPM-capable scan engine 100 includes an illumination light source 72 for generating illumination light, an imaging lens arrangement 60, an imaging sensor 62 having photosensitive elements, and a controller 90 for controlling both the illumination light source 72 and the imaging sensor 62. The controller 90, the illumination light source 72, the imaging lens arrangement 60, and the imaging sensor 62 are all deposited within the volume space of a solid rectangular having a height H, width W, and length L. The scan engine 100 can also includes a chassis within the volume space of the solid rectangular. In some implementations, the volume space of the solid rectangular can be substantially defined by the shape of the chassis; in other implementations, the chassis is in the volume space of the solid rectangular but does not have the shape of any solid rectangular. The scan engine 100 also includes a diffusive plate 110 substantially perpendicular to the optical axis 61 of the imaging lens arrangement 60 and covering a side face of the solid rectangular. The area enclosed by the boundary of the diffusive plate (as defined by segment AB, BC, CD, and DA as shown in FIG. 4) substantially equal to the area of the side face having the dimension of the height H and the width W, and the diffusive plate 110 includes a first opening 169 to allow light enter the imaging lens arrangement 60 through the first opening 169. In the scan engine 100, the photosensitive elements in the imaging sensor 62 are configured to detect light from a target object 40 within an imaging field of view (FOV) through the imaging lens arrangement 60 during a time period when the target object 40 is illuminated by diffusive light from the diffusive plate 110 as light from the illumination light source 72 is projected onto the diffusive plate 110.

Implementations of the scan engine 100 can include one or more of the following features. The controller 90 can be further configured for processing data received from the imaging sensor 62 to decode an image of a barcode on the target object 40. In some implementations, as shown in FIG. 3 and FIG. 4, the area enclosed by the boundary of the diffusive plate 110 is in the shape of a rectangular having the height thereof substantially identical to the height H of the volume space of the solid rectangular and having the width thereof substantially identical to the width W of the volume space of the solid rectangular. In other implementations, the area enclosed by the boundary of the diffusive plate 110 can be in other shape. In some implementations, as shown in FIG. 3 the illumination light source 72 comprises two light emitting diodes 72A and 72B.

In some implementations, the diffusive plate 110 is made of volume diffusion material. In some implementations, as shown in FIG. 3, the diffusive plate includes two surfaces separated from each other by a distance "t" that can either be substantially uniform or substantially non-uniform. In some implementations, the diffusive plate 110 comprises microscopic refractive structures on at least one of the surfaces of the diffusive plate. The diffusive plate 110 can include a second opening 189 to allow aiming light from an aiming light source 82 (which is not shown in FIG. 3) to pass through.

Figure 5:
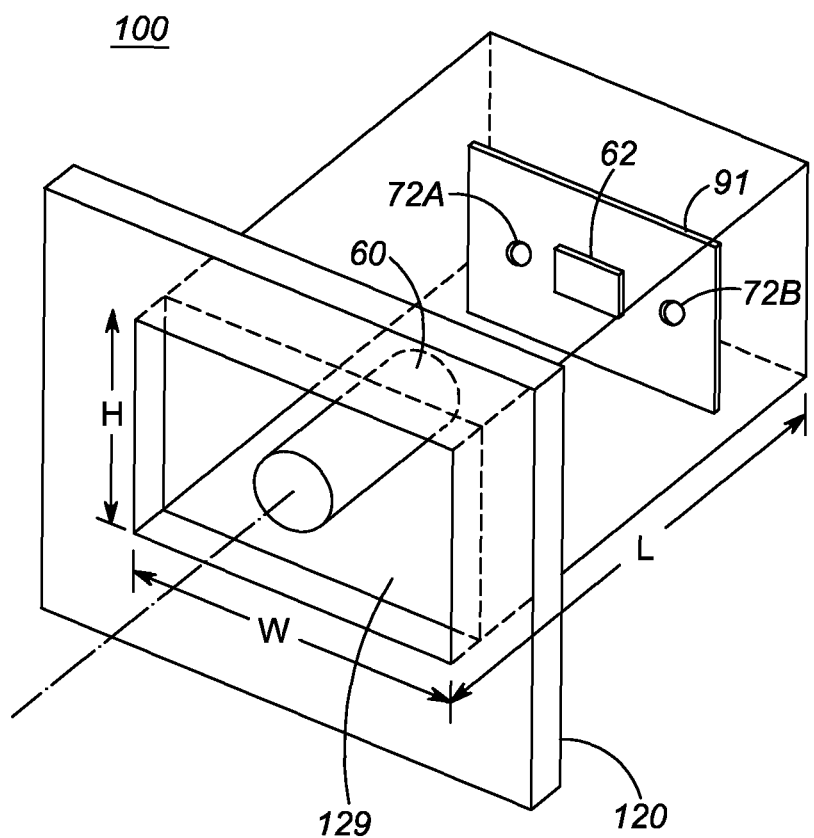
FIG. 5 is a schematic of a DPM-capable apparatus in accordance with some embodiments.

FIG. 5 is a schematic of a DPM-capable apparatus in accordance with some embodiments. The apparatus in FIG. 5 an illumination light source for generating illumination light, an imaging lens arrangement 60, an imaging sensor 62 having photosensitive elements, and a controller 90 for controlling both the illumination light source and the imaging sensor 62. In FIG. 5, the controller 90, the imaging lens arrangement 60, and the imaging sensor 62 are all deposited within the volume space of a solid rectangular having a height H, width W, and length L. In addition to the LEDs 72A and 72B placed on the circuit board 91, the illumination light source includes one or more additional LEDs deposited outside the volume space of the solid rectangular (these additional LEDs are not explicitly shoe in FIG. 5). The apparatus in FIG. 5 also includes an auxiliary diffusive plate 120 having an inner opening 129 in the shape of a rectangular having the height thereof substantially identical to the height H of the volume space of the solid rectangular and having the width thereof substantially identical to the width W of the volume space of the solid rectangular. The photosensitive elements in the imaging sensor 62 are configured to detect light from a target object within an imaging field of view through the imaging lens arrangement 60 during a time period when the target object 40 is illuminated by diffusive light from the auxiliary diffusive plate 120 as light from the illumination light source is projected onto the auxiliary diffusive plate 120. In one example, light from one or more additional LEDs deposited outside the volume space of the solid rectangular can be projected onto the auxiliary diffusive plate 120 to generate the diffusive light for illuminating the target object 40.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
    an illumination light source for generating illumination light;
    an imaging lens arrangement;
    an imaging sensor having photosensitive elements;
    a controller for controlling both the illumination light source and the imaging sensor;
    wherein the controller, the illumination light source, the imaging lens arrangement, and the imaging sensor are all deposited within the volume space of a solid rectangular having a height H, width W, and length L;
    a diffusive plate substantially perpendicular to the optical axis of the imaging lens arrangement and covering a side face of the solid rectangular, with the area enclosed by the boundary of the diffusive plate substantially equal to the area of the side face having the dimension of the height H and the width W, wherein the diffusive plate comprises a first opening to allow light enter the imaging lens arrangement through the first opening;
    wherein the photosensitive elements in the imaging sensor are configured to detect light from a target object within an imaging field of view through the imaging lens arrangement during a time period when the target object is illuminated by diffusive light from all of a front surface of the diffusive plate as light from the illumination light source is projected onto the diffusive plate; and
    an auxiliary diffusive plate detachably mounted outside the boundary of the diffusive plate, wherein the auxiliary diffusive plate is made of volume diffusion material and has two surfaces separated from each other by a distance that is less than one fifth (⅕) of both the height H and the width W of said volume space.

2. The apparatus of claim 1, wherein the controller is further configured for processing data received from the imaging sensor to decode an image of a barcode on the target object.

3. The apparatus of claim 1, wherein the area enclosed by the boundary of the diffusive plate is in the shape of a rectangular having the height thereof substantially identical to the height H of the volume space of the solid rectangular and having the width thereof substantially identical to the width W of the volume space of the solid rectangular.

4. The apparatus of claim 1, wherein the illumination light source comprises two light emitting diodes.

5. The apparatus of claim 1, wherein the illumination light source comprises a first light emitting diode and a second light emitting diode, and wherein the boundary of the diffusive plate comprises a first side and a second side, the first light emitting diode being positioned at a position with the distance to the first side shorter than the distance to the second side, and the second light emitting diode being positioned at a position with the distance to the first side longer than the distance to the second side.

6. The apparatus of claim 1, wherein the diffusive plate is made of volume diffusion material.

7. The apparatus of claim 1, wherein the diffusive plate comprises microscopic refractive structures on at least one of the surfaces of the diffusive plate.

8. The apparatus of claim 1, wherein the diffusive plate comprises a second opening to allow aiming light from an aiming light source to pass through.

9. The apparatus of claim 1, further comprising:
    wherein the auxiliary diffusive plate has an inner opening in the shape of a rectangular having the height thereof substantially identical to the height H of the volume space of the solid rectangular and having the width thereof substantially identical to the width W of the volume space of the solid rectangular.

10. A method comprising:
    illuminating an target object with diffusive light from a diffusive plate by projecting light from an illumination light source onto the diffusive plate that is substantially perpendicular to the optical axis of an imaging lens arrangement and covers a side face of a solid rectangular defining a volume space within which parts of a scan engine are deposited, said parts of the scan engine including at least the illumination light source, the imaging lens arrangement, an imaging sensor, and a controller for controlling both the illumination light source and the imaging sensor, wherein the diffusive plate comprises a first opening to allow light enter the imaging lens arrangement through the first opening, and wherein the area enclosed by the boundary of the diffusive plate substantially equal to the area of the side face having the dimension of a height H and a width W of the solid rectangular;
    detecting light from the target object through the imaging lens arrangement with photosensitive elements in the imaging sensor during a time period when the target object is illuminated by the diffusive light from all of a front surface of the diffusive plate; and
    mounting an auxiliary diffusive plate detachably on the scan engine with the auxiliary diffusive plate positioned outside the boundary of the diffusive plate, wherein the auxiliary diffusive plate is made of volume diffusion material and has two surfaces separated from each other by a distance that is less than one fifth (⅕) of both the height H and the width W of said volume space.

11. The method of claim 10, further comprising:
    processing data received from the imaging sensor to decode an image of a barcode on the target object.

12. The method of claim 10, wherein the area enclosed by the boundary of the diffusive plate is in the shape of a rectangular having the height thereof substantially identical to the height H of the volume space of the solid rectangular and having the width thereof substantially identical to the width W of the volume space of the solid rectangular.

13. The method of claim 10, wherein the illumination light source comprises two light emitting diodes.

14. The method of claim 10, wherein the diffusive plate is made of volume diffusion material.

15. The method of claim 10, wherein the diffusive plate comprises microscopic refractive structures on at least one of the surfaces of the diffusive plate.

16. The method of claim 10, further comprising:
projecting an aiming light from an aiming light source onto the target object through a second opening on the diffusive plate.

17. The method of claim 10, further comprising:
mounting the auxiliary diffusive plate on the scan engine, wherein the auxiliary diffusive plate has an inner opening in the shape of a rectangular having the height thereof substantially identical to the height H of the volume space of the solid rectangular and having the width thereof substantially identical to the width W of the volume space of the solid rectangular.

18. An apparatus comprising:
an illumination light source for generating illumination light;
an imaging lens arrangement;
an imaging sensor having photosensitive elements;
a controller for controlling both the illumination light source and the imaging sensor;
wherein the controller, the imaging lens arrangement, and the imaging sensor are all deposited within the volume space of a solid rectangular having a height H, width W, and length L, and wherein the illumination light source includes one or more LEDs deposited outside the volume space of the solid rectangular;
an auxiliary diffusive plate having an inner opening in the shape of a rectangular having the height thereof substantially identical to the height H of the volume space of the solid rectangular and having the width thereof substantially identical to the width W of the volume space of the solid rectangular, wherein the auxiliary diffusive plate is made of volume diffusion material and has two surfaces separated from each other by a distance that is less than one fifth ($\frac{1}{5}$) of both the height H and the width W of said volume space; and
wherein the photosensitive elements in the imaging sensor are configured to detect light from a target object within an imaging field of view through the imaging lens arrangement during a time period when the target object is illuminated by diffusive light from the auxiliary diffusive plate as light from the illumination light source is projected onto the auxiliary diffusive plate.

* * * * *